Jan. 30, 1962  C. PASS  3,018,716
DEEP WELL FRYER

Filed Dec. 15, 1958  3 Sheets-Sheet 1

INVENTOR.
CARL PASS
BY *Alfred W. Petchaft*
ATTORNEY

Jan. 30, 1962 C. PASS 3,018,716
DEEP WELL FRYER
Filed Dec. 15, 1958 3 Sheets-Sheet 2

INVENTOR.
CARL PASS
BY
ATTORNEY

Jan. 30, 1962 C. PASS 3,018,716
DEEP WELL FRYER
Filed Dec. 15, 1958 3 Sheets-Sheet 3

INVENTOR.
CARL PASS
BY Alfred W Petchaft
ATTORNEY

United States Patent Office 3,018,716
Patented Jan. 30, 1962

3,018,716
DEEP WELL FRYER
Carl Pass, 33 Briarcliff, Ladue 24, Mo.
Filed Dec. 15, 1958, Ser. No. 780,484
8 Claims. (Cl. 99—331)

This invention relates in general to certain new and useful improvements in culinary equipment and, more particularly, to a deep well fryer for use in restaurants and similar food establishments.

It is a primary object of the present invention to provide a deep well fryer which is compact and efficient in construction and arrangement so as to occupy a minimum of space in a restaurant or food establishment and simplify the necessary operations attendant upon the deep frying of food products.

It is also an object of the present invention to provide a deep well fryer of the type stated embodying a control valve which is ordinarily concealed but is, nevertheless, readily accessible for purposes of turning the fryer on or off, and also for varying the regulated operating temperatures thereof.

It is another object of the present invention to provide a deep well fryer of the type stated which is capable of being moved to various stations within the restaurant or establishment and quickly connected to a gas-fuel line.

It is an additional object of the present invention to provide a deep well fryer of the type stated having a cooking basket which is capable of being supported on the edge of the cooking well so that cooking oil can be drained from the cooked food back into the cooking well without spilling over the outer edges of the cooking well.

With the above and other objects in view, my invention resides in the novel features of form, construction, arrangement, and combination of parts presently described and pointed out in the claims.

In the accompanying drawings (three sheets)—

Figure 2:
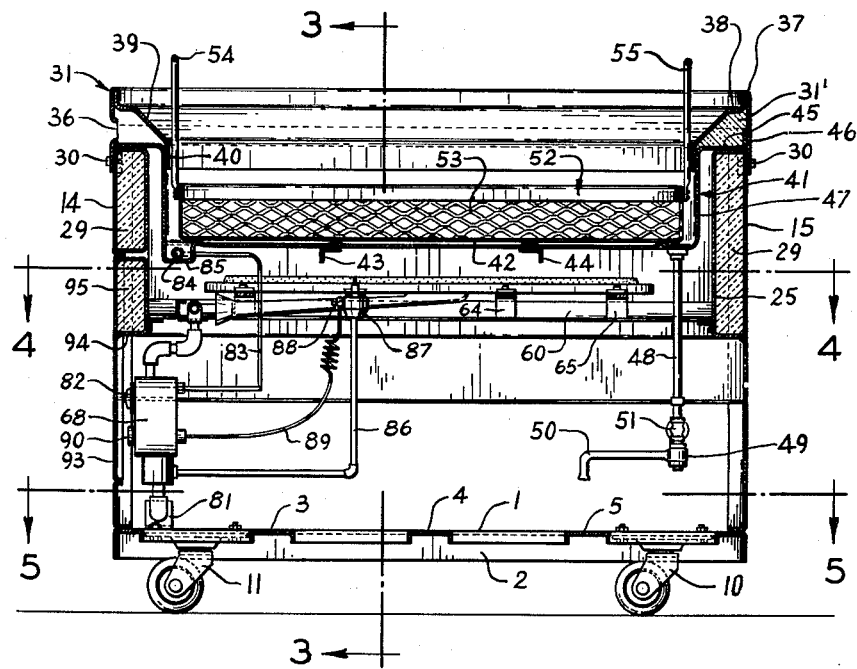
FIG. 2 is a sectional view taken along line 2—2 of FIG. 1.
Figure 3:
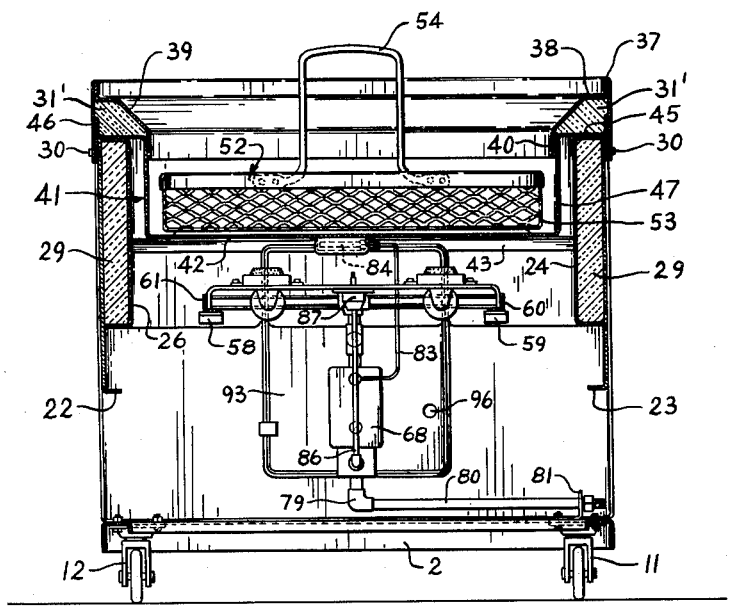
Figure 7:
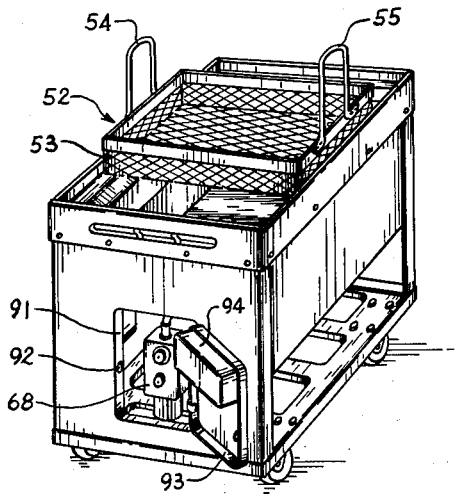
Figure 6:
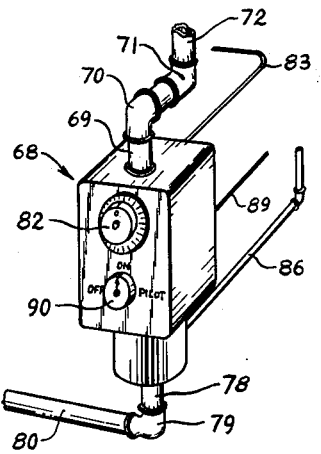
Figure 4:
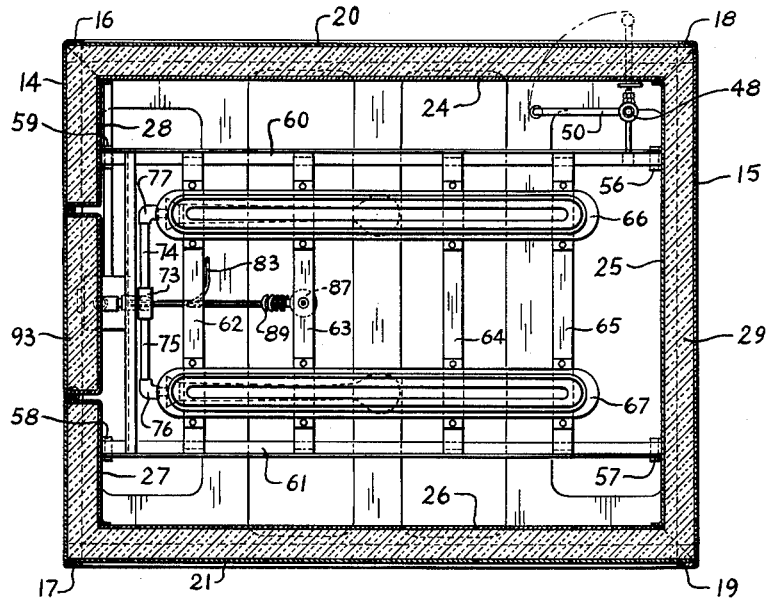
Figure 5:
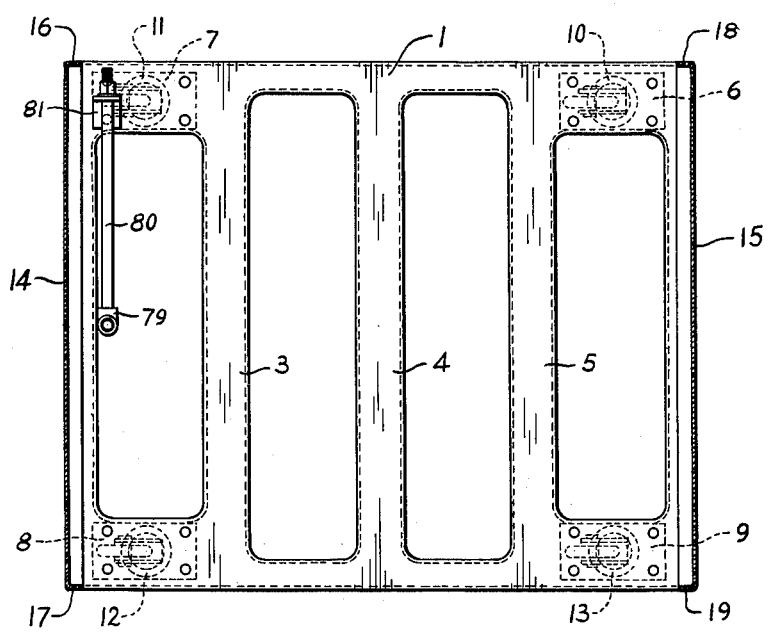

FIGS. 3, 4, and 5 are sectional views taken along lines 3—3, 4—4, and 5—5, respectively, of FIG. 2;

FIG. 6 is a fragmentary front elevational view of the control valve forming part of the present invention; and FIG. 7 is a perspective view of the deep well fryer with the front door open and the cooking basket removed from the cooking well.

Referring now in more detail and by reference characters to the drawings which illustrate a practical embodiment of the present invention, A designates a deep well fryer comprising a heavy gauge metal base plate 1 formed with a downwardly extending marginal flange 2 and a plurality of transverse channel-shaped ribs 3, 4, 5. Bolted or otherwise rigidly secured to the underside of the base plate 1 adjacent the four corners thereof are caster plates 6, 7, 8, 9, for swivelly supporting floor-contacting casters 10, 11, 12, 13. Welded at their lower ends to the base plate 1 adjacent its front and rear margins are sheet metal front and rear walls 14, 15, provided with vertical side flanges 16, 17, 18, 19, and welded to the flanges 16, 17, 18, 19, are spaced parallel side panels 20, 21, which are provided at their lower edges with inwardly turned flanges 22, 23, the latter lying in upwardly spaced relation to the base plate 1. Welded or otherwise rigidly secured to the walls 14, 15, and side panels 20, 21, adjacent their upper ends are U-shaped sheet metal channels 24, 25, 26, 27, 28, each of which are filled with a suitable heat insulating material 29. As seen by reference to FIGS. 2 and 3 the channels 24, 25, 26, 27, 28, terminate at their lower edges in upwardly spaced relation from the flanges 22, 23.

Secured to the upper ends of the walls 14, 15, and side panels 20, 21, by means of bolts 30, is a cap 31 which is filled with heat insulating material 31' and is formed of four contiguous sections 32, 33, 34, 35, the latter being on the front wall 14 and including an elongated opening 36. Along its upper edge the cap 31 is provided with an upstanding marginal flange 37 which terminates at its lower end in a relatively narrow horizontal shelf 38 which, in turn, is formed at its inner margins with inclined walls 39. Formed on the inner ends of the inclined walls 39 are vertical flanges 40, and welded to the flanges 40 is a generally rectilinear cooking well 41 having a bottom wall 42 supported by a pair of spaced transversely extending channels 43, 44, which are rigidly secured at their opposite ends to the sheet metal channels 24, 26. The cooking well 41 is, furthermore, provided at its upper end with outwardly extending flanges 45, which rest on the U-shaped channels 24, 26, and are also welded or otherwise rigidly secured to the vertical web 46 on the cap sections 32, 34. Consequently, the four walls 47 of the cooking well 41 are spaced from the channels 24, 25, 26, 27, 28, so that, in effect, the cooking well 41 is suspended from the cap 31 and channels 24, 25, 26, 27. At its rearwardmost end the bottom wall 42 of the cooking well 41 is provided with a depending drain pipe 48, the lower end of which terminates upwardly of the base plate 1 and is provided with a swivel-joint 49 which carries a drain spout 50. The drain pipe 48 is also provided adjacent the fitting 49 with a valve 51, whereby the spout 50 can be swung outwardly to the position shown in dotted lines in FIG. 4 and the valve 51 opened to drain cooking oil from within the cooking well 41.

Provided for removable disposition within the cooking well 41 is a cooking basket 52 having an expanded metal body 53 provided on its opposite ends with U-shaped handles 54, 55. The length of the cooking basket 52 is approximately equal to the distance between the flanges 37 on the cap sections 32, 34, so that when the cooking basket 52 is removed from the cooking well 42, the cooking basket 52 can rest on the shelf 38 between the flanges 37, as shown in FIG. 7.

Welded to the inside vertical faces of the channels 27, 28, and 25 are brackets 56, 57, 58, 59, having a pair of spaced parallel longitudinally extending channels 60, 61, mounted thereon, and rigidly secured at their opposite ends to the channels 60, 61, is a plurality of transversely extending spaced parallel bars 62, 63, 64, 65, for supporting a pair of elongated gas burners 66, 67. Mounted adjacent to but inwardly of the front wall 14 is a conventional control valve 68 provided on its outward side with a pipe 69 and a pair of elbows 70, 71, the latter being connected to a short pipe 72 which is connected to a T 73. Branching out from the T 73 are two conduits 74, 75, which are connected to elbows 76, 77, the elbows 76, 77, in turn, being connected to the gas burners 66, 67. On its intake side the valve 68 is provided with a short intake pipe 78 which is connected through an elbow 79 and a pipe 80 which extends towards one side of the deep well fryer, and is supported at the edge of the base 1 by means of a bracket 81. A suitable gas line (not shown) may be attached to the outer end of the pipe 80 for delivery through the valve 68 to the gas burners 66, 67. The valve 68 also includes a conventional thermostat having a control knob 82 and a copper tube 83 which extends outwardly from the valve 68 and is connected to a sensing bulb 84 which is mounted in an elongated well 85 formed at the front end of the bottom wall 42. Also extending outwardly from the valve 68 is a pilot supply line 86 which is connected to a pilot light 87 mounted between the gas burners 66, 67, and cooperating with the pilot light 87 is a conventional pilot thermocouple 88 including a copper tube 89, the latter also being connected into the valve 68. The control knob 90 on the valve 68 is of the three position type, i.e., the knob 90 can be set to either the "off" position, the "on" position, or the "pilot" position so as to control the operation of the deep well fryer A.

Figure 1:
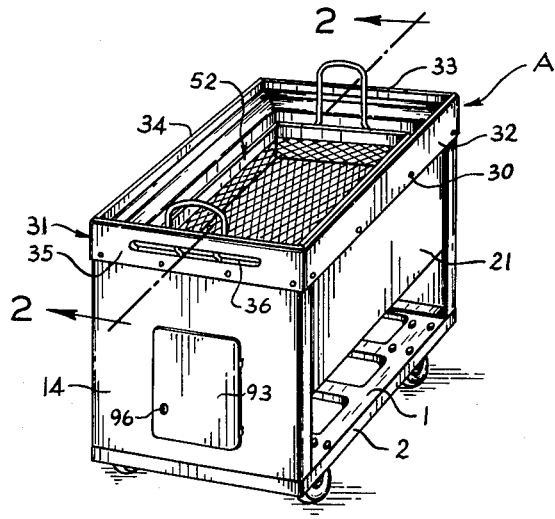
FIG. 1 is a perspective view of a deep well fryer constructed in accordance with and embodying the present invention.

Adjacent the valve 68 the front wall 14 is provided with a door opening 91 having a magnetic door lock 92 projecting thereinto, and swingably mounted adjacent the door opening 91 is a door 93 which, when closed, fits flush with the front wall 14 as shown in FIG. 1. The door 93 is, furthermore, provided on its inside face with a cup-like member 94 which encloses a suitable heat-insulating material 95 and underlies the channels 27, 28, when the door 93 is in the closed position. Also formed on the door 93 is a finger hole 96 whereby the door may be conveniently opened to the position shown in FIG. 7.

In use, the deep well fryer A is rolled on the casters 10, 11, 12, 13, to a suitable station within the restaurant or other establishment and a suitable gas line (not shown) is connected to the line 80, the valve control knob 90 being in the "off" position. The knob 90 is then rotated to the "pilot" position whereupon the pilot light 87 can be ignited to energize the pilot thermocouple 88. With the valve 51 closed, cooking oil is poured into the cooking well 41 whereupon the knob 90 can be turned to the "on" position and ignite the gas burners 66, 67, and heat the oil within the cooking well 41. The thermostat control knob 82 may be suitably adjusted so that the oil in the cooking well 41 is maintained at a substantially constant temperature. The cooking basket 52 with the food therein can then be immersed into the heated oil and the food cooked for the proper length of time, whereupon the basket 52 can be removed from the cooking well 41 and placed between the flanges 37 as shown in FIG. 7. The heated oil will then drain downwardly from the food back into the cooking well 41 without spilling over the sides of the flanges 37. When it is desired to turn off the gas burners 66, 67, the door 93 may be opened and the knob 90 turned to the "pilot" position whereupon the burners 66, 67, will be shut off, while at the same time the pilot light 87 will remain igntied. At such times as it is necessary to drain the oil from within the cooking well 41 the spout 50 is swung outwardly to the dotted line position shown in FIG. 4 in which the spout projects outwardly beyond the panel 21 so that a suitable bucket or other container can be placed below the spout and receive the oil when the valve 51 is opened.

It should be understood that changes and modifications in the form, construction, arrangement, and combination of the several parts of the deep well fryer may be made and substituted for those herein shown and described without departing from the nature and principle of my invention.

Having thus described my invention, what I claim and desire to secure by letters patent is—

1. A deep well fryer comprising a plurality of marginally interconnected wall-forming members, insulation means mounted on the inside faces of said members, an insulated cap member mounted on the upper ends of said members and projecting upwardly therefrom, said cap member also projecting inwardly from the juncture with the wall-forming members, a cooking well attached to the inwardly extending portion of the cap member and projecting downwardly into the space between said members so that the walls of said cooking well are confined completely within said fryer in spaced juxtaposed relation with said insulation means, burner means disposed in downwardly displaced relation to said cooking well, and valve means for controlling said burner means, said valve means including a thermostat and sensing bulb for temperature sensing and located in such a position that heat generated by the burners will not affect the temperature sensing means.

2. A deep well fryer comprising a plurality of marginally interconnected wall-forming members, insulation means mounted on the inside faces of said members, an insulated cap member mounted on the upper ends of said members and projecting upwardly therefrom, said cap member also projecting inwardly from the juncture with the wall-forming members, a cooking well attached to the inwardly extending portion of the cap member and projecting downwardly into the space between said members, all of the walls of said cooking well being in spaced juxtaposed relation with said insulation means, valve controlled drain means connected to said cooking well and depending therefrom, burner means disposed in downwardly spaced relation to said cooking well, and valve means for controlling said burner means, said valve means including a thermostat and sensing bulb for temperature sensing and located in such a position that heat generated by the burners will not affect the temperature sensing means.

3. A deep well fryer comprising a plurality of marginally interconnected wall-forming members, insulation means mounted on the inside faces of said members, an insulated cap member mounted on the upper ends of said members and projecting upwardly therefrom, said cap member also projecting inwardly from the juncture with the wall-forming members, and being provided with insulation therein, a cooking well attached to the inwardly extending portion of the cap member and projecting downwardly into the space between said members, the walls of said cooking well being in spaced juxtaposed relation with said insulation means and parallel with respect thereto, burner means disposed in downwardly spaced relation to said cooking well, and valve means for controlling said burner means, said valve means including a thermostat and sensing bulb for temperature sensing and located in such a position that heat generated by the burners will not affect the temperature sensing means.

4. A deep well fryer comprising a plurality of marginally interconnected wall-forming members, insulation means mounted on the inside faces of said members, an insulated cap member mounted on the upper ends of said members and having upstanding marginal flanges which are in alignment with and project above the wall-forming members, a cooking well secured to said cap member, said cap member also being provided with a pair of transversely inwardly extending flanges and projecting into the space between said wall-forming members so that the walls of the cooking well are in spaced juxtaposed relation with said insulation means, said cooking well being provided with a substantially flat base having a groove, temperature sensing means operatively mounted in said groove, burner means disposed in downwardly spaced relation to said cooking well, and valve means for controlling said burner means, said valve means including a thermostat and sensing bulb for temperature sensing and located in such a position that heat generated by the burners will not affect the temperature sensing means.

5. A deep well fryer comprising a plurality of marginally interconnected wall-forming members, insulation means mounted on the inside faces of said members, an insulated cap member mounted on the upper ends of said members and having upstanding marginal flanges which are in alignment with and project above the wall-forming members, said cap member also being provided with a pair of transversely inwardly extending flanges, a cooking well secured to said cap member and projecting into the space between said wall-forming members, the walls of the cooking well being in spaced juxtaposed relation with said insulation means, said cooking well being provided with a substantially flat base having a groove, temperature sensing means operatively mounted in said groove, a drain pipe extending downwardly from said cooking well, a spout swively mounted on said drain pipe for optional disposition outwardly of said wall-forming members, a pair of parallel burners dispcsed in downwardly spaced relation to said cooking well, said temperature sensing means being located near one end of and being in spaced relation between said pairs of parallel burners, and valve means for controlling said burner means.

6. A deep well fryer comprising a plurality of marginally interconnected wall-forming members, insulation means mounted on the inside faces of said members, a cap member mounted on the upper ends of said members and having upstanding marginal flanges which are in alignment with and project above the wall-forming members, said cap being provided interiorly thereof with insulation, said cap also being provided with a pair of transversely inwardly extending flanges, a cooking well secured to said cap member and projecting into the space between said wall-forming members, the walls of the cooking well being in spaced juxtaposed parallel relation with said insulation means, said cooking well being provided with a substantially flat base having a groove, temperature sensing means operatively mounted in said groove, a drain pipe extending downwardly from said cooking well, a spout swively mounted on said drain pipe for optional disposition outwardly of said wall-forming members, a pair of parrallel burners disposed in downwardly spaced relation to said cooking well, said temperature sensing means being located near one end of and being in spaced relation between said pairs of parallel burners, and valve means for controlling said burner means, said valve means including a thermostat, said groove being located in such position that the heat generated by the burners will not affect the sensitivity of the temperature sensing means in said groove, said temperature sensing means also being located in the lowest portion of said cooking well whereby to measure the lowest temperature of the fluid therein.

7. A deep well fryer comprising a plurality of marginally interconnected wall-forming members, insulation means mounted on the inside faces of said members, a cap member mounted on the upper ends of said members and having upstanding marginal flanges which are in alignment with and project above the wall-forming members, said cap being provided interiorly thereof with insulation, said cap also being provided with a pair of transversely inwardly extending flanges, a cooking well secured to said cap member and projecting into the space between said wall-forming members, the walls of the cooking well being in spaced juxtaposed parallel relation with said insulation means, said cooking well being provided with a substantially flat base having a groove centrally located at one end of said cooking well, a drain pipe extending downwardly from said cooking well, a spout swively mounted on said drain pipe for optional disposition outwardly of said wall-forming members, a pair of parallel burners disposed in downwardly spaced relation to said cooking well, said groove being located near one end of said cooking well and in spaced relation between said pair of parallel burners, said groove also being located in the lowest portion of said cooking well, temperature sensing means located within said groove, so that the heat generated by the burners will not affect the sensitivity of the temperature sensing means in said groove, and valve means for controlling said burner means, said valve means including a thermostat operatively connected to said temperature sensing means so that the temperature of the cooking well will remain constant at a preselected setting.

8. A deep well fryer comprising a plurality of marginally interconnected wall-forming members, insulation means mounted on the inside faces of said members, an insulated cap member mounted on the upper ends of said wall-forming members and having upstanding marginal flanges which are in alignment with and project above the wall-forming members, said cap member being provided with a pair of transversely inwardly extending flanges, a cooking well secured to and suspended from said cap member and projecting into the space between said wall-forming members, the walls of the cooking well being in spaced juxtaposed parallel relation with said insulation means, a cooking basket provided for removable disposition within said cooking well and of such size that said basket can rest on the inwardly extending flanges of said cap member and can be inserted within the cooking well while oriented in another direction, said cooking well being provided with a substantially flat base having a groove centrally located at one end of said cooking well, a drain pipe extending downwardly from said cooking well, a spout swively mounted on said drain pipe for optional disposition outwardly of said wall-forming members, a pair of parallel burners disposed in downwardly spaced relation to said cooking well, said groove being located near one end of said cooking well and in spaced relation between said pair of parallel burners, said groove also being located in the lowest portion of said cooking well, temperature sensing means located within said groove, so that the heat generated by the burners will not affect the sensitivity of the temperature sensing means in said groove, and valve means for controlling said burner means, said valve means including a thermostat operatively connected to said temperature sensing means so that the temperature of the cooking well will remain constant at a preselected setting.

References Cited in the file of this patent

UNITED STATES PATENTS

| | | |
|---|---|---|
| 1,176,239 | Page | Mar. 21, 1916 |
| 1,681,099 | Clark | Aug. 14, 1928 |
| 1,803,690 | Bettenga | May 5, 1931 |
| 1,996,434 | O'Dowd | Apr. 2, 1935 |
| 2,000,609 | Pitman | May 7, 1935 |
| 2,593,392 | Budlane et al. | Apr. 15, 1952 |
| 2,848,894 | Pappas | Aug. 26, 1958 |
| 2,867,164 | Lutze | Jan. 6, 1959 |